| | | |
|---|---|---|
| **United States Patent** [19] | [11] **Patent Number:** | **4,929,086** |
| **Geyer** | [45] **Date of Patent:** | **May 29, 1990** |

[54] CONTINUOUS RATE FEED HOPPER

[76] Inventor: Paul Geyer, 15660 Tacoma, Detroit, Mich. 48025

[21] Appl. No.: 347,118

[22] Filed: May 4, 1989

[51] Int. Cl.[5] .......... B28C 7/04; B29B 1/06

[52] U.S. Cl. .......... 366/76; 241/38; 241/260.1; 366/77; 366/81; 366/89; 366/90; 425/202; 425/382.3; 425/DIG. 230

[58] Field of Search .......... 366/76, 77, 78, 79, 366/81, 89, 90, 318, 319, 150; 425/DIG. 230, 376.1, 382.3, 202; 241/260.1, 38, 62

[56] References Cited

U.S. PATENT DOCUMENTS

| | | | |
|---|---|---|---|
| 3,782,700 | 1/1974 | Wittrock | 366/76 |
| 3,788,613 | 1/1974 | Romero | 366/76 |
| 3,871,810 | 3/1975 | Geyer | 425/374 |
| 3,888,469 | 6/1975 | Geyer | 366/79 |
| 3,985,348 | 10/1976 | Skidmore | 366/76 |
| 4,075,712 | 2/1978 | Geyer | 366/80 |

*Primary Examiner*—Robert W. Jenkins
*Attorney, Agent, or Firm*—Dykema Gossett

[57] ABSTRACT

The apparatus is for the continuous mixing of rubber like polymers with chemical additives to form a homogeneous compound, using minimum unproductive work, such as mixing already mixed material, or massive batch blending to correct lean and rich mixtures previously produced. The apparatus consists of a feeding means adapted to continuously and uniformly advance baled polymer into a machine hopper provided with a multi-purpose rotor, adapted to cut the advancing bale into shreds, in the presence of the chemical additives, mix the shredded polymer with the chemical additives and advance the resulting compound into a continuous mixing means. Mixing with minimum waste motion is expected to produce a superior compound not possible to obtain with present day production equipment.

12 Claims, 3 Drawing Sheets

CONTINUOUS RATE FEED HOPPER

FIELD OF THE INVENTION

This invention relates to an apparatus adapted to feed baled polymer continuously and at an exact rate into a mixing machine hopper provided with a multi-purpose rotor which cuts the bale to shreds while exposed to chemical additives, mixes the materials and transports the resulting mixture into a continuous flow mixing machine.

BACKGROUND OF THE INVENTION

The Rubber Industry primarily uses internal batch type mixers to mix baled polymer with preweighed compounding chemicals. The internal mixer action wedges the baled polymer between its two rotors and mixing chamber surfaces, smear and shearing the polymer progressively into smaller and smaller pieces, an operation which requires rugged equipment with high power input. This high power input heats the batch and limits the batch mixing time due to temperature. The finished batch is dropped onto a mill or into an extruder for sheeting or pelletizing and transfer to the next operation.

Limited use of continuous mixing is being performed by a unit combining the internal mixer with extruders. The unit consists of a dual rotor feed end, which resembles the internal mixer, with each rotor being formed into an extruder at its discharge end. A third extruder is placed at right angles to combine the output of the two rotors. As the feed end smears the baled polymer, heat is developed in the polymer before chemical additives are exposed to adequate polymer surface area to begin the mixing process. Thus the mixing quality is approximately the same as produced by the internal mixer and mills type of mixing line.

SUMMARY OF THE INVENTION

It is therefore a feature of the present invention to provide an improved apparatus which will enter bale size pieces of polymer continuously and at an exact rate into a feed hopper, to permit chemical additives to be continuously added in the proper proportion.

Another feature is to provide a bale feed apparatus which develops adequate pressure to force the bales into the feed hopper.

Still another feature is to provide a feed hopper fitted with a multi-purpose rotor, which cuts the incoming polymer into shreds, exposes the cut shreds to chemical additives, initiates mixing and continuously transports the resulting material into a rotor and barrel type mixing apparatus.

A further feature is to provide a feed hopper which cuts the polymer to small pieces, instead of the typical shearing smearing action of the internal mixer.

A still further feature is to provide a feed hopper which, by cutting the bales instead of shearing and smearing, reduces the work input, which work can be put to better use when all of the compounding ingredients are present.

Another feature is to provide a feed hopper which is fitted with a dust stop at the bale entrance to confine the chemical additives.

Still another feature is to provide a feed hopper which be eliminating unproductive shearing permits additional mixing when all ingredients are present.

A further feature is, by accomplishing the mix with less shearing, the viscosity of the polymer is maintained at a higher level, to be used as a quality improvement or for oil extension at the same quality level.

A still further feature is the shredding of the polymer bale in the presence of the chemical additives which simulates the mixing action of a multitude of small batches and eliminates the necessity of large batch blending.

Another feature is the use of a one roll die at the mixing apparatus exit, which by sensing the slab thickness can adjust to produce a uniformly thick slab to eliminate reweighing at following mixing stages.

DESCRIPTION OF THE PREFERRED EMBODIMENT

Introduction

Figure 1:
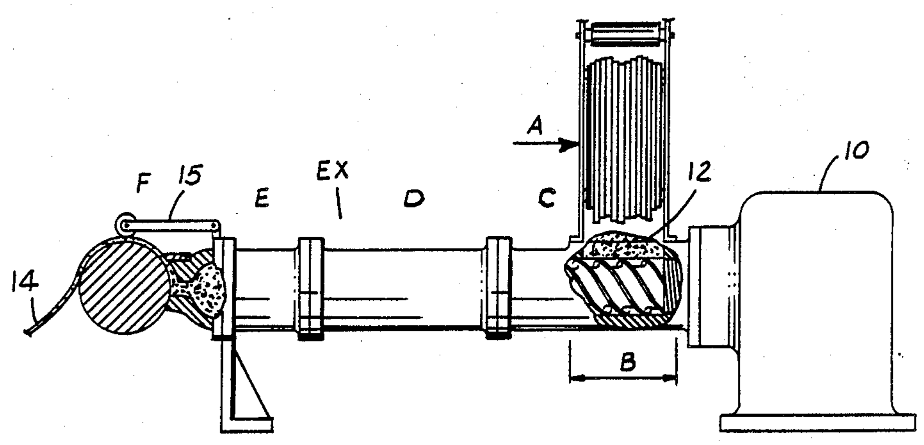
FIG. 1 is a sectional elevational view of a mixing extruder fitted with the continuous bale feeding apparatus in accordance with the present invention and is the preferred embodiment as applied to the feeding of baled polymer into the extruder hopper, while extruding the resulting mixed process material from the other end.

As an introduction to the present invention, there is provided a new and improved apparatus, of the rotor and barrel type, having a feed means, integral with the extruder feed hopper, which continuously enters polymer bales to the extrusion screw, to be cut into shreds by screw action in the presence of compounding chemicals. The feeding means consists of two sets of clamp bars sandwiching the bale and provided with in-running circular rotation, coacting to contact the bale when the rotational movement is toward the extruder hopper and to clear the bale when the rotational movement is away from the extruder hopper. Coacting pairs of clamp bars progressively contact the bale to make the feeding continuous and at a preset rate to thereby establish a base proportional rate for the continuous feeding of compounding chemicals.

The polymer advancing at a preset rate contacts the hopper extrusion screw which is provided with helical grooves or groove the top of which is provided with both radial and longitudinal knives, which cut shreds of polymer from the incoming bale. Ahead of and at the bale shredding area, compounding chemicals are introduced continuously at a rate, consistent with the established base rate of the polymer and in position to contact the enormously increased surface of the newly shredded polymer, establishing a macro mix and preventing the polymer from re-adhering to itself. The result is that a uniform macro mix is achieved, before amy significant power is expended. Starting the mix, with all the compounding material at hand, combined in a macro mix, eliminates the usual pockets of rich and lean mixtures, thus the need for large batch blending is practically eliminated, as the batches are very small. This reduced work and the work saved by cutting the polymer is available for downstream extrusion mixing. The combined performance can be such that the mix is achieved with little lost motion (non-productive shearing) and thereby produce a compound, micro mixed with high viscosity available for oil extension, etc. Achieving the mix with the least waste motion should produce quality not achievable by any of the present day factory mixing apparatus.

DESCRIPTION OF EXTRUSION MIXING APPARATUS

Referring to the drawings, like reference numbers and letters donate the corresponding part throughout several views of the extrusion mixing apparatus.

The apparatus of FIG. 1 is constructed in accordance with the invention is the preferred embodiment as applied to the continuous feeding and mixing of baled polymer with compounding chemicals at a uniform rate and to continuously extrude the resulting compound at a uniform rate and dimension. The apparatus of FIG. 1, has a drive means 10, an end support 11, a barrel 13, continuous entering material 12, exiting material 14, and extrusion gage control dancer roll 15. The hopper B is provided with a feed means A, the extruder entrance C is preferred to be deaerating as per my U.S. Pat. No. 3,888,469. The mixing section D is preferred to be constructed as per my U.S. Pat. No. 4,075,712 which in addition to mixing provides mechanical temperature control of the extruded material. Section E is provided to develop extrusion pressure. Section F is a one roll die unit as per my U.S. Pat. No. 3,871,810 and is used to maintain a uniform thickness of the extruded material by roll speed adjustment.

Figure 2:
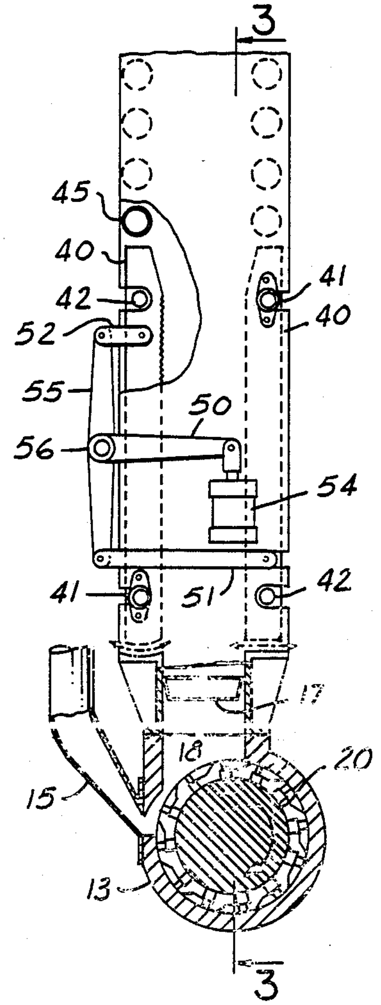
FIG. 2 is a front elevational view of the feeding apparatus.

FIG. 2 illustrates the front end view arrangement of the bale feed apparatus A of the extruder hopper B. It features a rotor 20 rotating in a barrel 13, communicating with chemical feed system 15 and bale feed entrance 18 and dust seal 17. The bale feeder A features two sets of oscillating bars 40 arranged to sandwich the baled polymer between them and to contact the bale only when the oscillating motion is in a downward direction. The oscillating, position of individual pairs of bars is staggered to provide continuous locomotion to the polymer bale. The sets of bars are anchored at cam shaft 41 and are free to swing at cam shaft 42. To provide adjustable pressure, contacting the baled polymer, the air cylinder powered clamp mechanism 50, 51, 54, 55, and 56 is arranged to maintain the oscillating bars 40 parallel to each other while firmly contacting the bales. The idler rolls 45 guide the bales into the feeder.

Figure 3:
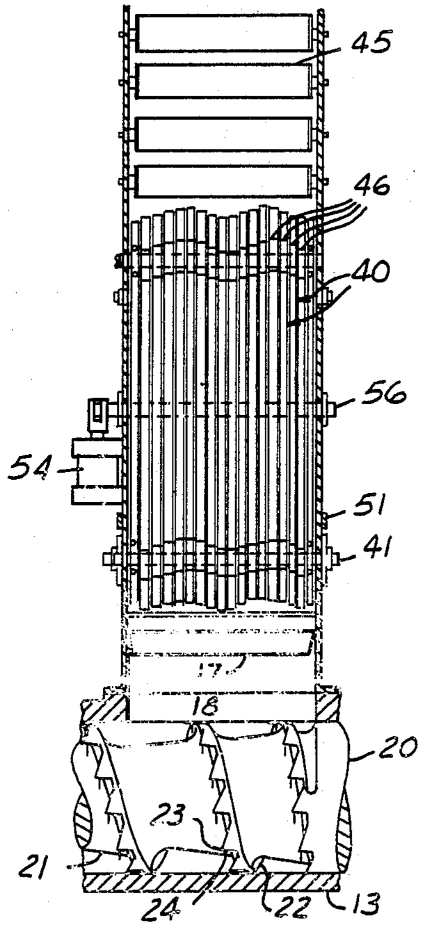
FIG. 3 is a cross-sectional taken on line 3—3 of FIG. 2.

FIG. 3 illustrates the section 3—3 of FIG. 2 and features the extruder rotor 20 provided with a helical groove 21, a helical ridge 22, extending to the outside diameter of the rotor, and provided with longitudinal 23 and radial 24 knives also extending to the outside diameter of the rotor. Also illustrated is one set of oscillating bars 40, fixed cam shaft 41, free cam shaft 42, and cams 46. The position of the bars 40 and the cams 46 illustrate the staggered arrangement.

Figure 4:
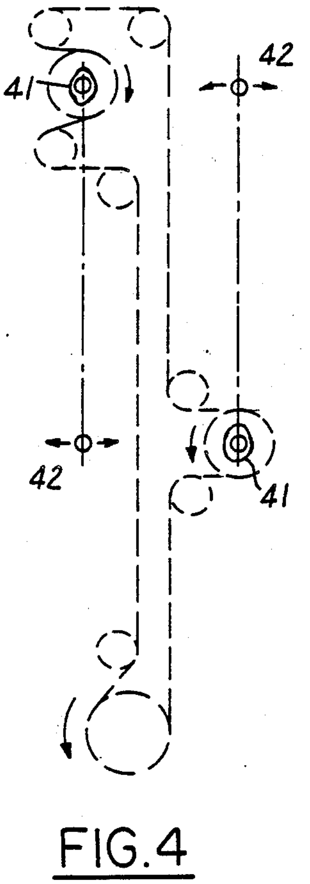
FIG. 4 is a single line drawing of the drive means of cam shafts 41.

FIG. 4 illustrates the rear view of the feeder A and is a one line drawing of the drive means from the extruder drive 10 to the cam shafts 41. For variable speed feeding, the drive can be powered by a separate power source.

Figure 5:
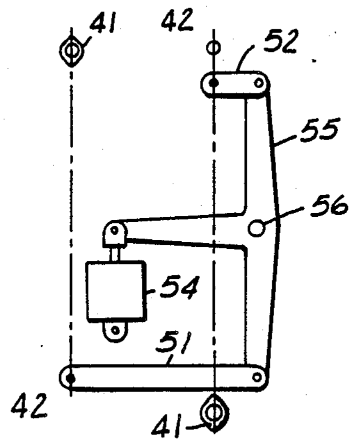
FIG. 5 is an end elevational view of the bale clamping mechanism in the open position.

FIG. 5 illustrates the open position of the clamping mechanism 51, 52, 54, 55, and 56.

Figure 6:
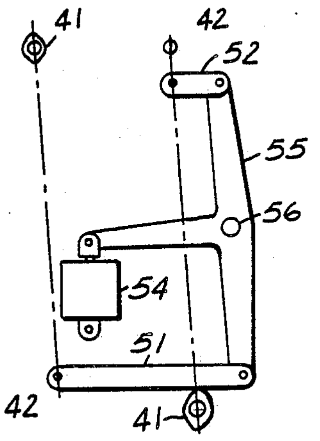
FIG. 6 is an end elevational view of the bale clamping mechanism in the closed position.

FIG. 6 illustrates the closed position of the clamping mechanism 51, 52, 54, 55, and 56. The spacing is such that the bales are contacted before the closed position is reached.

Figure 7:
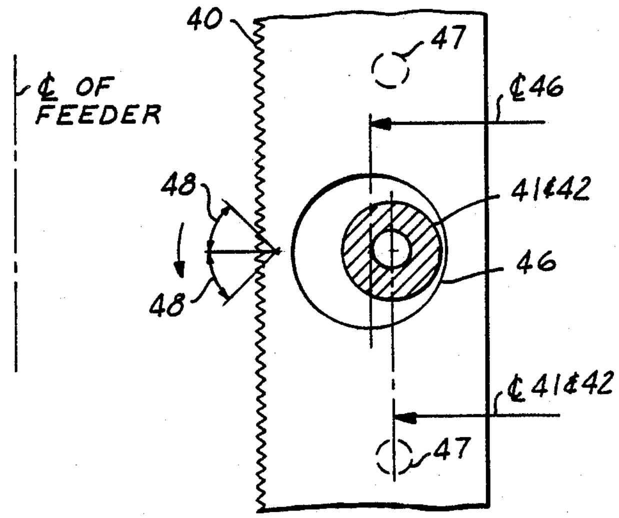
FIG. 7 is an enlarged view of the cams 46, cam shafts 41 and 42, arranged to drive the bars 40 in a circular path 47.

FIG. 7 illustrates the cam drive 46 as installed on cam shafts 41 and 42. The oscillating motion imparted to the bars 40 is shown as 47. Contact with the bales is shown as 48 and is a quarter of a turn. Other pairs of bars are set to make the drive continuous.

Figure 8:
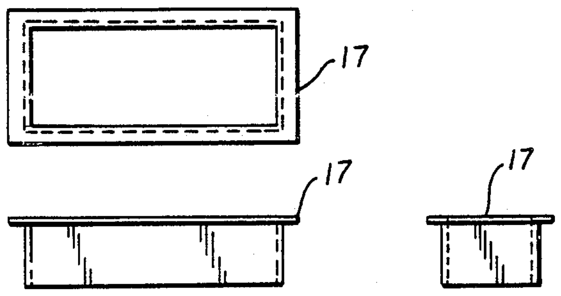
FIG. 8 is a rubber dust stop for installation at the extruder hopper entrance.

FIG. 8 illustrates a dust stop located in the hopper entrance 18. It is preferably made of rubber and reinforced with steel springs as required.

Figure 9:
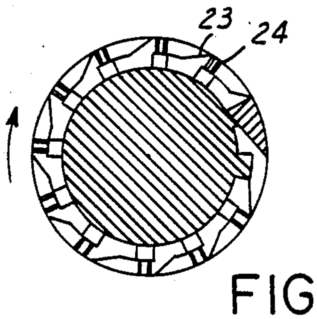
FIG. 9 is a typical cross-sectional view of FIG. 10.
Figure 10:
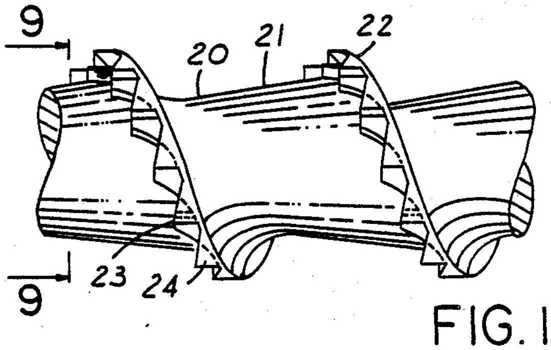
FIG. 10 is an elevational view of the hopper extrusion screw 20 fitted with a single start helical extrusion groove.

FIG. 9 is a cross-sectional view on line 9—9 of FIG. 10 and shows the arrangement of the longitudinal knife 23 and radial knife 24.

FIG. 10 illustrates a single lead helical rotor grove 21 of rotor 20. Ridge 22, longitudinal knife 23 and radial knife 24 are all at the rotor outside diameter.

Figure 11:
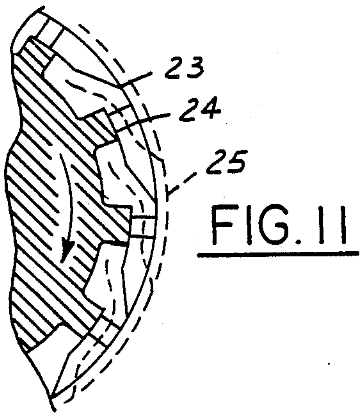
FIG. 11 is an enlarged view of FIG. 9.

FIG. 11 is an enlarged cross-sectional view of FIG. 9 and illustrates the flow path 25 of the polymer as it is cut from the entering bale.

Figure 12:
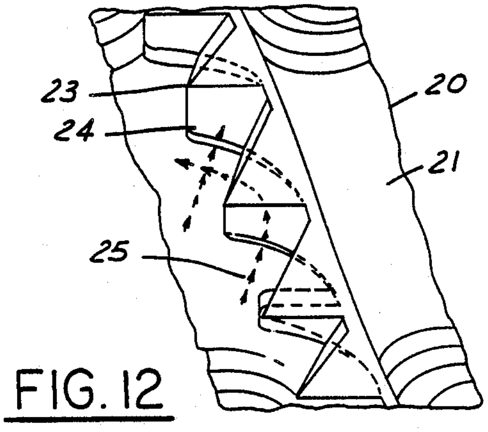
FIG. 12, is an enlarged view of FIG. 10.

FIG. 12 is an enlarged view of FIG. 10 and illustrates the plan view of the flow path 25 of the polymer as it is cut from the entering bale.

Figure 13:
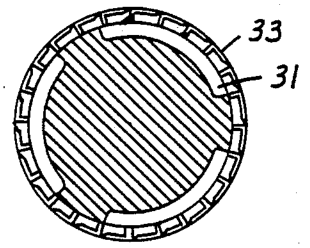
FIG. 13 is a typical cross-sectional view of FIG. 14.
Figure 14:
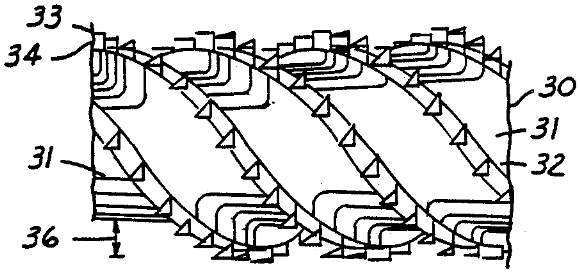
FIG. 14 is an elevational view the hopper extrusion screw fitted with a three start helical grooves.

FIG. 13 is a typical cross-sectional view of Figure of FIG. 14 and illustrates the three start helical grooves 31, ridge 32 and knives 33 and 34.

FIG. 14 illustrates three start helical grooves 31 of alternate rotor 30 with ridge 32 extending part way to the rotor outside diameter. Depth of groove 36 increases along the length of the hopper to provide over capacity and thereby develop in groove churning and mixing.

Figure 15:
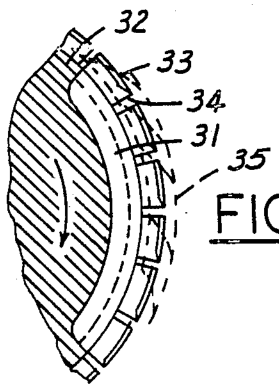
FIG. 15 is an enlarged view of FIG. 13.

FIG. 15 is an enlarged view of FIG. 13 and illustrates the flow path 35 of the polymer as it is cut from the entering bale.

Figure 16:
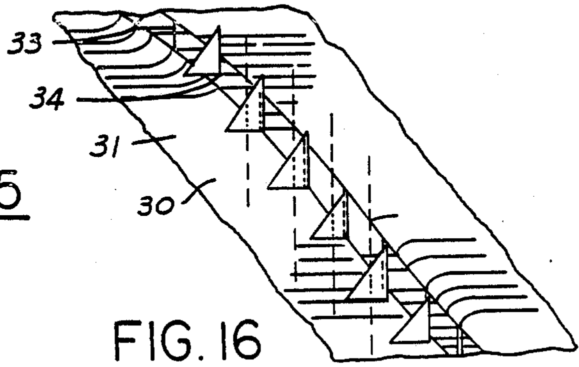
FIG. 16 is an enlarged view of FIG. 14.

FIG. 16 is an enlarged view of FIG. 14 and illustrates the flow path 35 of the polymer as it is cut from the entering bale.

What I claim is:

1. An apparatus for the continuous feeding, at a uniform rate, of rubber like polymer in the form of standard bales or in multiple strip form of know weight per unit length and chemical additives, into a continuous mixing machine having a hopper, a multi-purpose hopper rotor and a hopper barrel, said hopper having a feed throat communicating with said hopper rotor which is rotatably mounted in the hopper barrel; first means operable to advance the said polymer at an exact uniform preset rate, in relation to the mixing machine rotor speed, capable of firmly clamping the polymer with adequate pressure to force the polymer into said hopper rotor without change of feed rate; second means including said multi-purpose hopper rotor consisting of helical grooves or groove formed by helical ridges provided with, at their outer portion, multiple longitudinal and radial knives, arranged to cut strips of polymer from said incoming bales; third means including an opening in said barrel before or at the said bale cutting operation, to provide an entrance for the chemical additives, in a manner which tends to coat the freshly cut surfaces of the polymer with the additives, to initiate the mixing action; and fourth means integral with said rotor and said helical grooves, to cause excess extrusion capacity to create turbulence flow to initiate mixing, develop pressure and to transport the process material at a continuous and uniform rate downstream and into the entrance of a rotor and barrel type mixing machine.

2. An apparatus for the continuous feeding of baled polymer and chemical additives into a rotor and barrel type mixing machine, having a bale feed mechanism operable to uniformly and continuously to advance said bales into a mixing machine hopper, provided with a multi-purpose rotor provided with helical grooves formed by helical ridges, the outer portion of said ridges fitted with both longitudinal and radial knives arranged to cut slices of polymer from the incoming bales, communicating with said rotor is an opening for the chemical additives to enter, said opening is located to direct the chemical additives to the polymer as it is cut from the bales, the inner portion of said helical grooves coacting with the hopper barrel surface, initiates mixing of the shredded polymer with the chemical additives and transports the resulting mixture downstream into the entrance of a barrel and rotor type mixing apparatus, to thereby receive additional mixing.

3. The apparatus as defined in claim 2, wherein said bale feed mechanism can be moved to a horizontal position 90 degrees clockwise to facilitate the entrance of chemical additives.

4. The apparatus as defined in claim 2, wherein the chemical additives are metered by standard continuous feeding devices set to deliver at a rate proportional to the rate of polymer feed.

5. The apparatus as defined in claim 2, wherein said longitudinal and radial knives can direct the cut polymer to the trailing edge of the leading helical groove or to the leading edge of the following helical groove.

6. The apparatus as defined in claim 2, wherein the helical groove or grooves of said hopper rotor can vary in extrusion capacity, starting shallow and increasing in depth in a downstream direction.

7. The apparatus as defined in claim 2, wherein a one roll die is provided at the exit end and is used to extrude a uniformly thick extrusion, thereby measuring length only to obtain weight of the compound for downstream compounding.

8. The apparatus as defined in claim 2, wherein the rate of material being fed into and the capacity of the mixing unit can be adjusted to be equal and thereby the mixing unit can be continuously at 100% and all material processed will be subjected to uniform treatment.

9. The apparatus as defined in claim 2, wherein the clamping pressure of the bale feeder can be varied by controlling the air pressure to the actuating air cylinder.

10. The apparatus as defined in claim 2, wherein the number of helical rotor grooves can be varied to suit the viscosity of the polymer being processed.

11. The apparatus as defined in claim 2, wherein said liquid chemicals can be pressure fed downstream of the hopper at a ratio as per specifications.

12. The apparatus as defined in claim 2, wherein multi-layer strip stock, when entering the hopper rotor will be cut into pellets due to stock thickness and thereby be in an even better condition to mix with additives.

* * * * *